United States Patent
Pirro et al.

(10) Patent No.: US 10,029,805 B2
(45) Date of Patent: Jul. 24, 2018

(54) SYSTEM FOR ADJUSTING THE PROFILES OF AERONAUTICAL STRUCTURES

(71) Applicant: ALENIA AERMACCHI S.p.A., Venegono Superiore, Varese (IT)

(72) Inventors: Nicola Pirro, Foggia (IT); Michelantonio Pinto, Foggia (IT)

(73) Assignee: ALENIA AERMACCHI S.p.A., Venegono Superiore, Varese (IT)

( * ) Notice: Subject to any disclaimer, the term of this patent is extended or adjusted under 35 U.S.C. 154(b) by 249 days.

(21) Appl. No.: 14/219,852

(22) Filed: Mar. 19, 2014

(65) Prior Publication Data

US 2014/0283386 A1 Sep. 25, 2014

(30) Foreign Application Priority Data

Mar. 21, 2013 (IT) .............................. TO2013A0224

(51) Int. Cl.
*B64F 5/10* (2017.01)
*B25B 11/02* (2006.01)

(52) U.S. Cl.
CPC ............... *B64F 5/10* (2017.01); *B25B 11/02* (2013.01); *Y10T 29/49622* (2015.01); *Y10T 29/49826* (2015.01)

(58) Field of Classification Search
CPC ............................... B64F 5/0009; B25B 11/02
See application file for complete search history.

(56) References Cited

U.S. PATENT DOCUMENTS

| 5,026,033 A | 6/1991 | Roxy |
| 5,352,075 A | 10/1994 | Stephens |
| 9,283,660 B1 * | 3/2016 | Dignam .................. B23Q 1/25 |
| 2004/0055130 A1 | 3/2004 | Scott et al. |

FOREIGN PATENT DOCUMENTS

| GB | 587 448 A | 4/1947 |
| WO | WO 2011/046482 A1 | 4/2011 |

OTHER PUBLICATIONS

Italian Search Report for corresponding Italian Patent Application No. TO2013A000224 dated Jan. 9, 2014.
European Search Report for corresponding European Patent Application No. 14160635 dated Jun. 26, 2014.

* cited by examiner

*Primary Examiner* — Moshe Wilensky
(74) *Attorney, Agent, or Firm* — Merchant & Gould P.C.

(57) ABSTRACT

An interface fitting for supporting a component of a structure to be assembled on an assembly jig, includes a component-side part, adapted to be attached to the component, and a jig-side part, configured to bear in an orientable way on the assembly jig. The support block further includes, a spacer member interposed between the component-side part and the jig-side part, which can be operated to adjust the distance between the component-side part and the jig-side part.

4 Claims, 4 Drawing Sheets

SYSTEM FOR ADJUSTING THE PROFILES OF AERONAUTICAL STRUCTURES

This application claims benefit of Serial No. TO2013A000224, filed 21 Mar. 2013 in Italy and which application is incorporated, herein by reference. To the extent appropriate, a claim of priority is made to each of the above disclosed applications.

BACKGROUND OF THE INVENTION

The present invention relates in general to processes for assembling component parts of structures, for example aeronautical structures.

As is known, the assembly of large parts takes place with the aid of an assembly jig, on which one of the components of a structure to be assembled is placed in a predetermined position to allow other components to be subsequently offered up and assembled by means of machinery. To allow the parts to be positioned and secured, in the correct relationship and with the tolerance specified on the design drawing, the jig is provided with supports having the property of being adjustable. The component to be mounted on the jig is designed to bear on these supports, through interface fittings previously attached to the component, to ensure that the component is centred on the supports. The orientation of the component can therefore be adjusted as desired by varying the height of the supports of the jig. The supports are adjusted until the aerodynamic surface is brought within the tolerances with respect to the other parts, using a laser measuring machine or mechanical stops.

This sequence of operations is relatively inconvenient in terms of production time, since, when the first component of the structure to be assembled has been placed on the jig, it is not possible to assemble the other components with it until the orientation of the first component has been adjusted so that it moves into the correct positioning as required.

SUMMARY OF THE INVENTION

One object of the present invention is therefore to provide a system for eliminating the downtime time caused by the adjustment of the components on the assembly jig.

According to the present invention, the aforesaid object is achieved by means of an interface fitting for supporting a component of a structure to be assembled on an assembly jig, comprising a component-side part, adapted to be attached to the component, and a jig-side part, configured to bear in an orientable way on the assembly jig, wherein the interface fitting further comprises a spacer member interposed between said component-side part and jig-side part, said spacer member being operable for adjusting the distance between said component-side part and said jig-side part.

The present invention makes use of the interface fittings which must be attached to the component to be assembled in preparation for its positioning on the assembly jig, and introduces into these fittings a provision for possible adjustment in a direction. In fact, this adjustment, carried out off-line on the interface fittings in a location separate from the assembly jig, makes it possible to avoid the adjustment of the orientation of the component on the assembly jig, such as the adjustment that is conventionally carried out by acting on the supports of the assembly jig themselves. Thus, when the component is positioned on the jig, it is already prepared for assembly to the other components, since any adjustment has already been carried out off-line on the interface fittings. Consequently there is no downtime caused by adjustment on the assembly jig.

A further object of the invention is a method for assembling a first component to at least one second component, comprising the following steps:

attaching a plurality of interface fittings to the first component, placing the first component on an assembly jig, in such a way that the first component bears on the assembly jig through the interface fittings, and assembling at least one second component to the first component placed on the assembly jig, wherein, before the first component is placed on the assembly jig, at least one spacer member incorporated in at least one of said interface fittings is adjusted to bring at least one surface of the first component into a predetermined tolerance range.

Specific embodiments are described in the dependent claims, the content of which is to be considered as an integral part of the present description.

BRIEF DESCRIPTION OF THE DRAWINGS

Further characteristics and advantages of the invention will be disclosed more fully in the following detailed description of an embodiment of the invention, provided by way of non-limiting example, with reference to the attached drawings, in which.

DETAILED DESCRIPTION OF THE PREFERRED EMBODIMENTS

Figure 1:
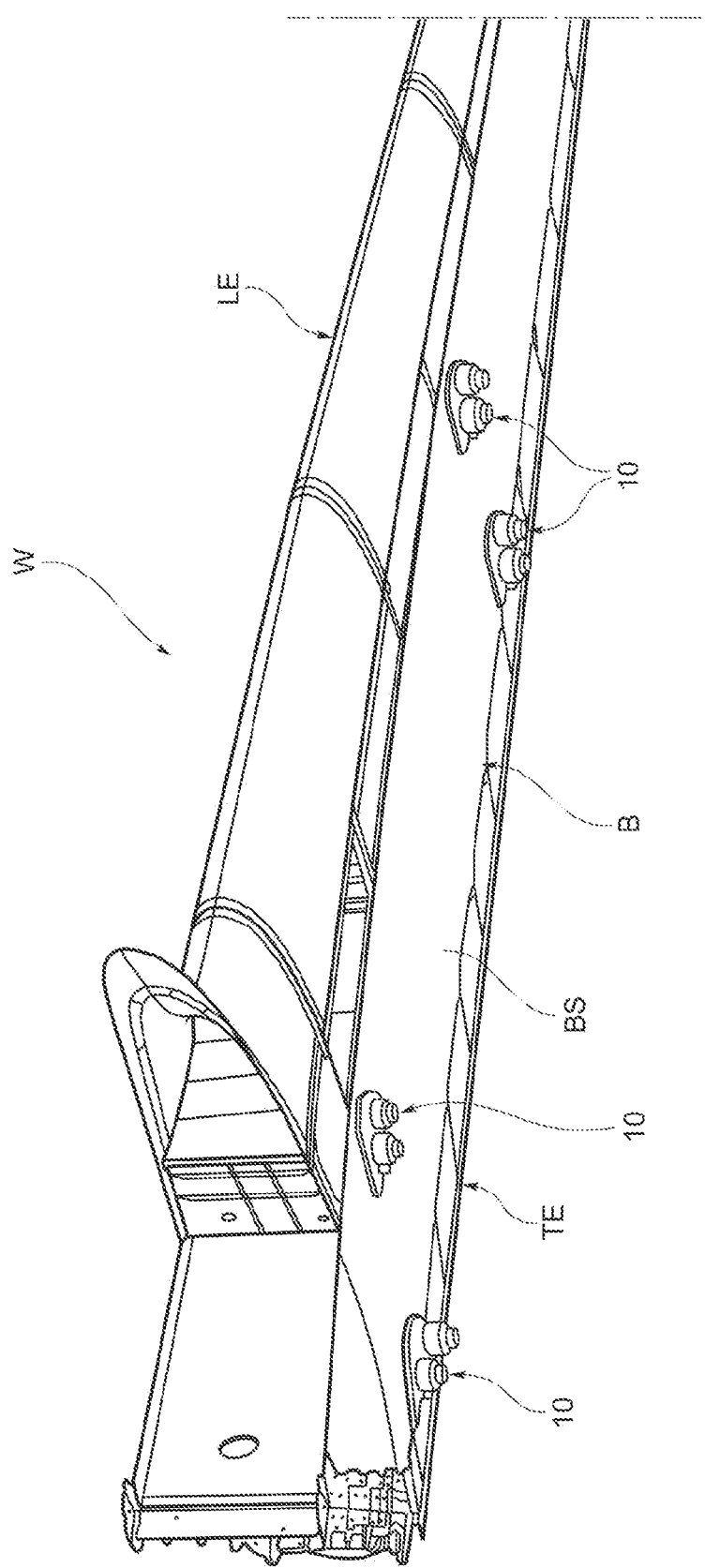
FIG. 1 is a perspective view from below, which represents a wing to which the interface fittings according to the invention are attached.

FIG. 1 shows an aeronautical structure, in particular a wing, indicated as a whole by W. FIG. 1 also shows a box B, a leading edge LE and a trailing edge TE, which form structural components of the wing W, manufactured separately and then assembled together to form the wing structure.

Figure 6:
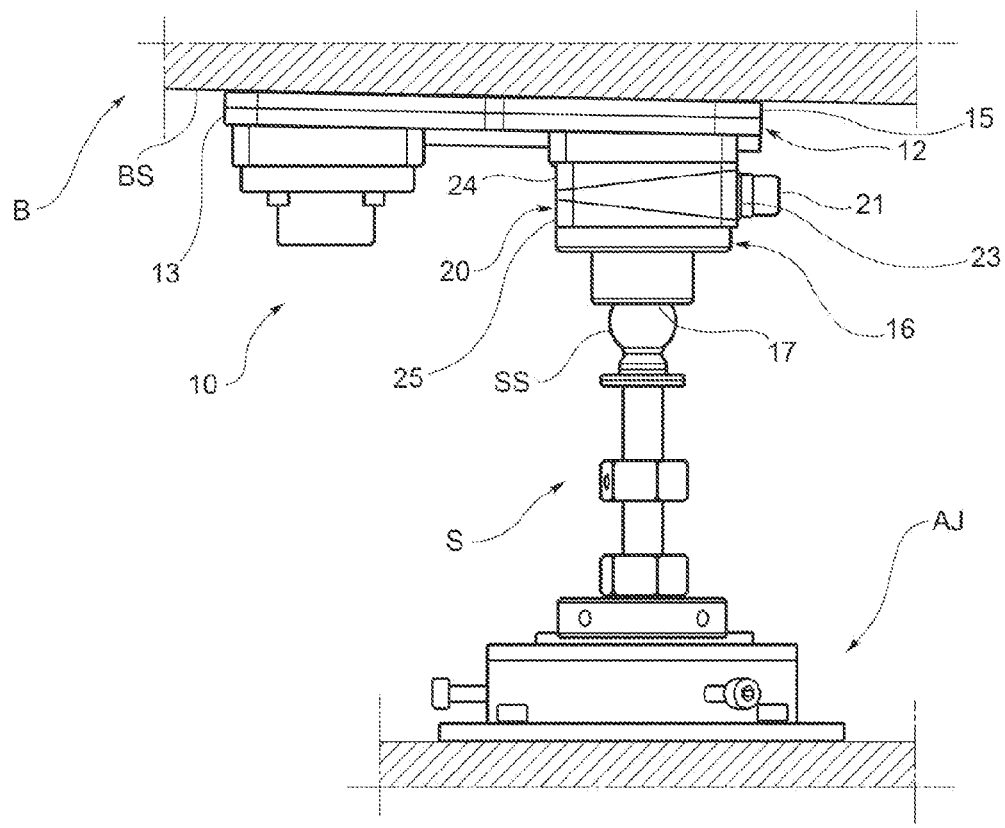
FIG. 6 is a view in elevation which represents a component which bears, through an interface fitting according to the invention, on a support of an assembly jig.

The assembly of these components takes place in a conventional manner on an assembly jig (shown in FIG. 6 and indicated by AJ); the box is first placed on the jig, and the leading edge and the trailing edge are then assembled to the box placed on the jig.

In order to be placed on the assembly jig, the box is prepared in advance by attaching to a lower surface BS of the box a plurality of interface fittings 10, which are intended to bear on respective supports S of the assembly jig AJ. In a conventional way, each of these supports S has a spherical surface SS on its upper end, to allow the angular orientation of the interface fittings 10 bearing on the supports.

An interface fitting 10 according to the invention is shown more fully in FIGS. 2 to 6.

This fitting 10 comprises a component-side part 12, adapted to be attached to the component, that is to say to the box B in the illustrated example. In a conventional way, the component-side part 12 of the fitting 10 comprises an attachment plate 13, in which a plurality of through holes 14 is formed for the passage of screws and/or pins for positioning and attaching the interface fitting B in a predetermined area of the lower surface BS of the box B. A protective layer 15 of anti-friction material such as polytetrafluoroethylene (PTFE) is positioned on the surface of the attachment plate 13 which is intended to come into contact with the surface of the component.

Figure 3:
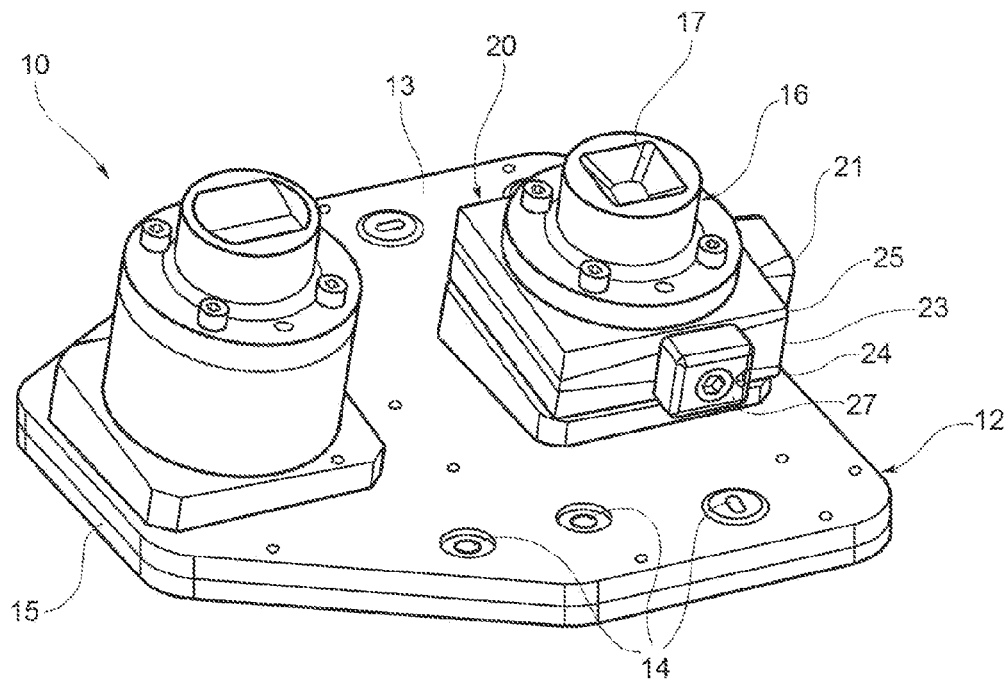
FIG. 3 is a perspective view from below, which represents an interface fitting according to the invention.
Figure 4:
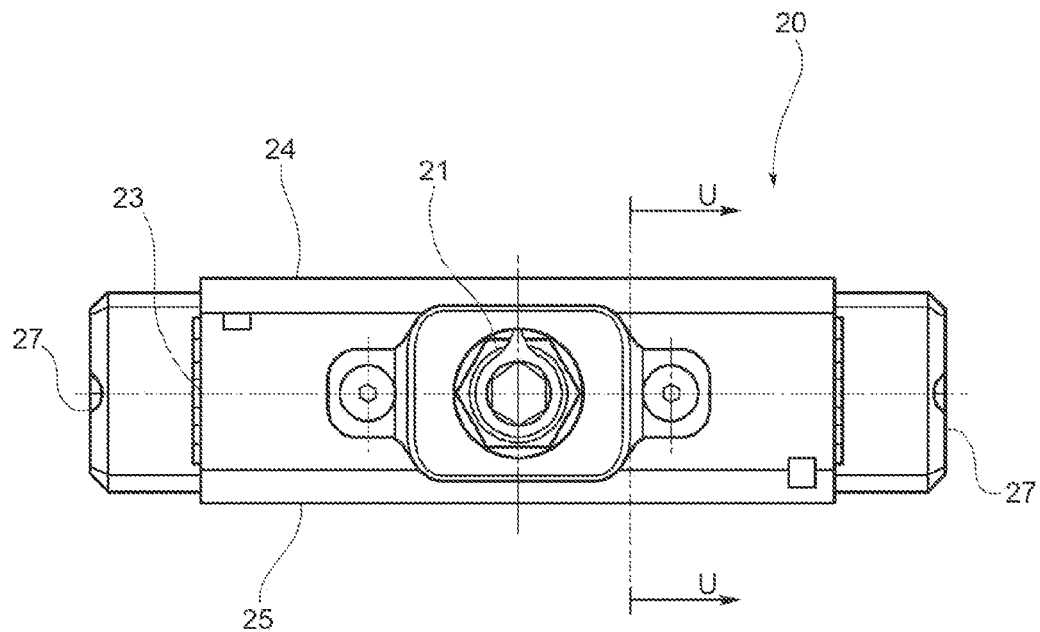
FIG. 4 is a side view of part of the interface fitting of FIG. 3.
Figure 5:
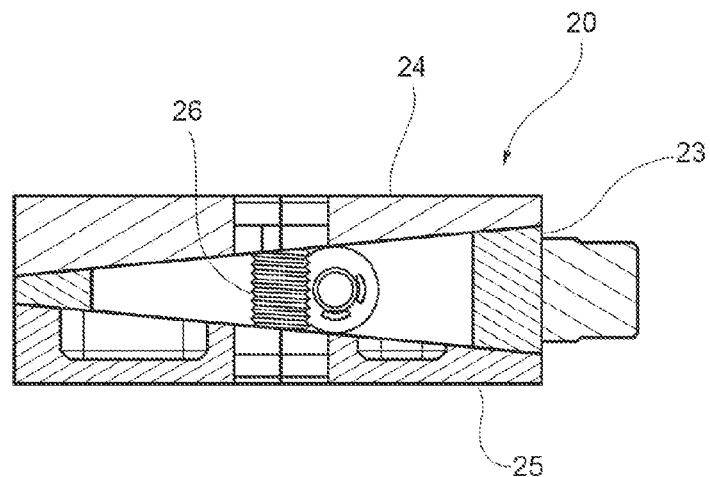
FIG. 5 is a sectional view taken along the line U-U of FIG. 4.

The interface fitting 10 further comprises a jig-side part 16 configured to bear in an orientable way on the assembly jig AJ. In particular, the jig-side part 16 of the interface fitting is configured to bear by means of a spherical hinge on the assembly jig AJ. For the purposes of the present invention, the expression "configured to bear" signifies that the jig-side part 16 of the interface fitting is configured to bear on the assembly jig without attachment devices for securing it thereto. For this purpose, a shaped recess 17, visible in FIG. 3, is formed in a conventional way on the jig-side part 16, allowing the interface fitting 10 to be centred on the respective support S of the jig, and, if necessary, to rotate by sliding on the spherical surface SS of the respective support S.

The interface fitting 10 further comprises an adjustable spacer member 20 which is interposed between the component-side part 12 and the jig-side part 16 and is attached to these parts. The spacer member 20 is operable for adjusting the distance between the component-side part 12 and the jig-side part 16 of the interface fitting 10.

Figure 2:
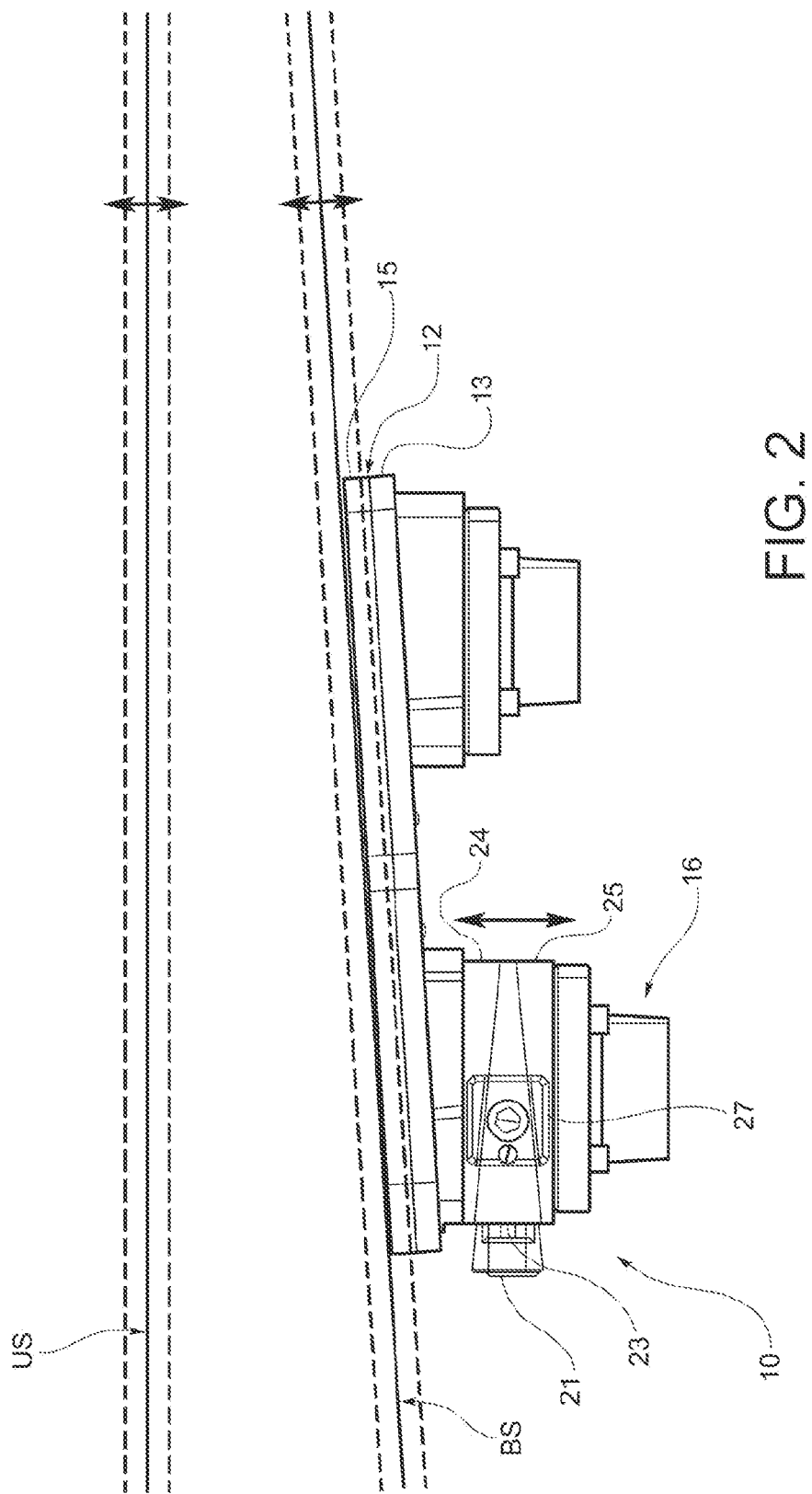
FIG. 2 is a schematic view in elevation of an interface fitting applied to a surface, showing the operating principle of the present invention.

As shown in FIG. 2, the fact that the interface fitting 10 comprises an adjustable spacer member 20 incorporated in it makes it possible to adjust the interface fitting 10 so as to bring at least one surface (in the example, the lower surface BS and the upper surface US of the box B) of the component B into a predetermined tolerance range. In FIG. 2, the positions that can be reached by the lower surface BS and the upper surface US of the box by adjusting the spacer member 20 of the interface fitting 10 are indicated in broken lines. The positions of the surfaces are detected in a conventional way by a measuring system, for example a laser alignment system.

Since the aforesaid adjustment can be carried out on the interface fittings 10, the adjustment no longer needs to be done on the supports S of the assembly jig AJ, but may take place off-line, in a separate location, before the component B is placed on the jig AJ. This enables the components to be assembled immediately as soon as the first component B has been placed on the jig AJ, simply because the adjustment of the orientation has already been carried out on the interface fittings. For its part, the assembly jig AJ can be simplified by comparison with conventional fittings, since it no longer has to be provided with height adjustment devices associated with the supports S.

FIGS. 2 to 6 show an exemplary embodiment of the spacer member 20 of the interface fitting; evidently, alternative mechanisms may be devised which would be equally capable of adjusting the distance between the component-side part and the jig-side part of the interface fitting 10.

In the illustrated example, this adjustment is carried out by means of an endless screw adjustment mechanism. An adjustment screw 21 of this mechanism is visible in the figures, this screw being connected by a helical coupling to a female screw (not visible in the figures) positioned within the spacer member 20. The head of the adjustment screw 21 is configured to allow the manual operation of the screw, particularly by means of a tool; in particular, this head may have a slot for receiving the end of a key or the blade of a screwdriver. Advantageously, the screw head is associated with indicator means which, when coupled to an angular scale placed around the screw head, can provide a relatively accurate indication of the angle of rotation of the screw.

The adjustment screw 21 is placed so as to be fixed with respect to translation to a wedge element 23, which is slidably positioned between a pair of inclined plane elements 24, 25, which are associated with the component-side part 12 and with the jig-side part 16 of the interface fitting 10 respectively, and which are fixed to them, for example by means of screws. The wedge element can be moved transversely with respect to the inclined plane elements 24, 25 by means of the endless screw adjustment mechanism, thereby causing the inclined plane elements 24, 25 to move selectively away from or towards each other, according to the direction of rotation of the adjustment screw, in a direction perpendicular to the direction of movement of the wedge element 23. The inclined plane elements 24, 25 are interconnected by a pair of tension springs 26 (only one of which is visible in FIG. 5), which press the inclined plane elements against each other, thus holding the spacer member together. At the sides of the sandwich structure formed by the inclined plane elements 24, 25 and the wedge element 23, there are also positioned respective lateral retaining elements 27 which are fixed to opposite sides of the wedge element 23 and extend in height beyond the thickness of the wedge element 23, so as to retain the inclined plane elements 24, 25 laterally with respect to the wedge element 23.

By operating the adjustment screw 21, therefore, it is possible to adjust the distance between the component-side part 12 and the jig-side part 16 of the interface fitting 10, thereby modifying the orientation of the component B bearing on the interface fitting 10.

The invention claimed is:

1. An assembly jig comprising a support and an interface fitting for supporting a component of a structure to be assembled on the assembly jig, said interface fitting comprising:

a component-side part adapted to be attached to a lower surface of the component;

a spacer member arranged below the component-side part; and a jig-side part arranged below the spacer member and bearing in an orientable way on an upper end of the support;

wherein said spacer member is interposed between said component-side part and said jig-side part, and wherein said spacer member is operable for adjusting a distance between said component-side part and said jig-side part;

wherein said spacer member comprises an endless screw adjusting mechanism, by which the distance between said component-side part and said jig-side part is adjustable;

wherein said spacer member comprises a wedge element slidably positioned between a pair of inclined plane elements, associated with the component-side part and with the jig-side part of the interface fitting respectively, said wedge element being movable transversely with respect to the inclined plane elements, by said endless screw adjusting mechanism;

wherein the wedge element comprises first and second wedge surfaces inclined to a linear motion axis of the wedge element, wherein the first inclined plane element comprises a component-side surface fixed to the component-side part of the interface fitting, and a first sliding surface in contact with the first wedge surface and inclined to the component-side surface, and wherein the second inclined plane element comprises a jig-side surface fixed to the jig-side part of the interface fitting, and a second sliding surface in contact with the second wedge surface and inclined relative to the jig-side surface.

2. The jig according to claim 1, wherein said component is an aeronautical component, comprising a wing box of a wing configured to be assembled with a leading edge of the wing and a trailing edge of the wing on the assembly jig.

3. The jig according to claim 1, wherein said jig-side part bears in an orientable way on the support free of attachment devices for securing the jig-side part to the support.

4. The jig according to claim 3, wherein said support comprises a spherical surface formed on the upper end of the support, and said jig-side-part comprises a recess bearing on the spherical surface.

* * * * *